W. F. Ketchum,
Mower.
Nº 9,737.   Patented May. 17. 1853.
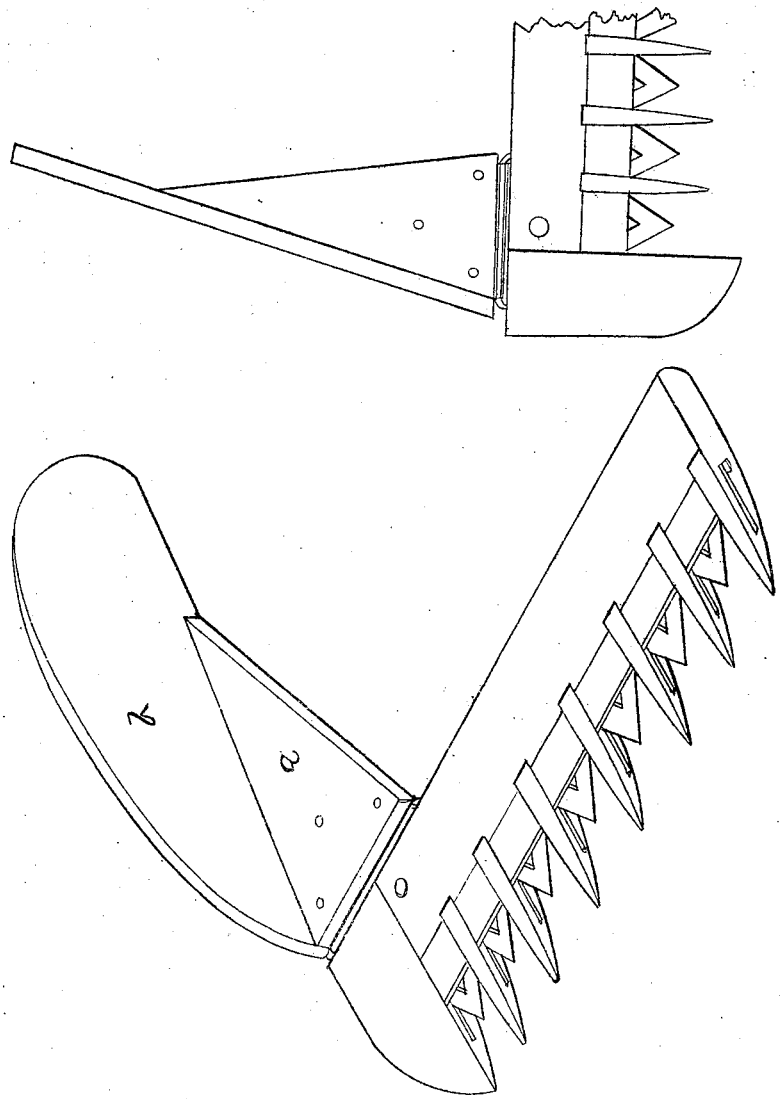

UNITED STATES PATENT OFFICE.

WM. F. KETCHUM, OF BUFFALO, N. Y., ASSIGNOR TO RUFUS L. HOWARD.

IMPROVEMENT IN TRACK-CLEARERS TO HARVESTERS.

Specification forming part of Letters Patent No. 9,737, dated May 17, 1853.

*To all whom it may concern:*

Be it known that I, WILLIAM F. KETCHUM, of Buffalo, in the county of Erie and State of New York, (assignor to RUFUS L. HOWARD, of the same place,) have invented a certain new and useful Improvement in Mowing or Grass-Cutting Machines; and I do hereby declare that the following is a full, clear, and exact description thereof, reference being had to the accompanying drawing and letters marked thereon, forming a part of this specification.

The object of my invention is to clear the track for the dead-point or heel of the rack-piece, when the machine is on the return-swath, by removing the cut grass from the standing stubble, turning it in out of the way, and preventing it from clogging or choking the cutters. This important object has never before been successfully accomplished. I have experimented several years to effect this object, and the contrivances used, though varying in construction, are essentially the same in principle, operation, and effect, and I therefore deem it unnecessary to describe them all in this specification, but will confine myself to a description of the contrivance I now have in use, and which I have found to operate with perfect satisfaction. It consists of a shield, scraper, or raking board, which is connected with the outer end of the rack-piece by a joint or hinge at an angle less than a right angle. Said scraper or raking board, as it trails along on the ground after and in the wake of the cutters, has the effect to remove the cut grass from the standing stubble, roll and turn it in toward the machine out of the way, leaving a clear track for the heel of the rack-piece to move in on the return-swath, and it also keeps the loose cut grass from choking or clogging and retarding the proper action of the cutters.

The accompanying drawing represents views of a portion of the rack-piece of my machine with my scraper combined, showing the angle at which said scraper is combined with said rack-piece.

Said scraper may be made of wood, iron, or other suitable material. If it is constructed of wood, a board, $a$, of suitable size may be provided—say three feet long, one inch thick, and fifteen inches wide at the end where it is hinged with the rack-piece, but tapering off on the outer edge to a point at its rear end. This forms the bottom or brace to hold the scraper in position. Another board, $b$, should be provided, and may be nailed to the edge of the first board. This forms the scraper at an angle with the rack-piece, and it rises ten or fifteen inches perpendicularly from the board $a$ at its highest point; but it is arched or rounded off on its upper edge and rounded or beveled a little on the under edge of its rear end to cause it to shed the cut grass and prevent the same from collecting thereon.

It is obvious that the angular brace-board may be dispensed with and other means used for holding said scraper at the proper angle. Said scraper, thus constructed, is combined with said rack-piece by a joint or hinge, so that it shall play freely on said joint and trail along behind the cutters, adapting itself to inequalities of the ground, &c.

Having thus fully described my invention, what I claim as new, and desire to secure by Letters Patent, is—

The scraper or raking board, constructed as described or in any similar manner, and combined with the rack-piece at an angle less than a right angle, substantially as, in the manner, and for the purpose herein fully set forth.

In testimony whereof I have hereunto signed my name before two witnesses.

WILLIAM F. KETCHUM.

Witnesses:
JOSEPH C. FIELD,
H. B. BENT.